Loomis & Thompson,
Bung,
No. 37,722.  Patented Feb. 17, 1863

Witnesses:
Thos Geo Harvey
Chas H. Smith

Inventors:
John S Loomis
S Thompson

UNITED STATES PATENT OFFICE.

JOHN S. LOOMIS AND ABEL THOMPSON, OF BROOKLYN, NEW YORK, ASSIGNORS TO ABEL THOMPSON AFORESAID.

IMPROVED BUNG FOR COAL-OIL BARRELS, &c.

Specification forming part of Letters Patent No. 37,722, dated February 17, 1863.

*To all whom it may concern:*

Be it known that we, JOHN S. LOOMIS and ABEL THOMPSON, of Brooklyn, in the county of Kings and State of New York, have invented, made, and applied to use a certain new and useful Improvement in Screw-Bungs for Casks or Barrels for Coal-Oil, &c.; and we do hereby declare the following to be a full, clear, and exact description of our said invention, reference being had to the annexed drawings, making part of this specification, wherein—

Figure 1:
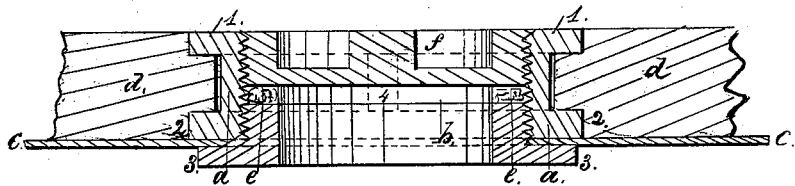
Figure 2:
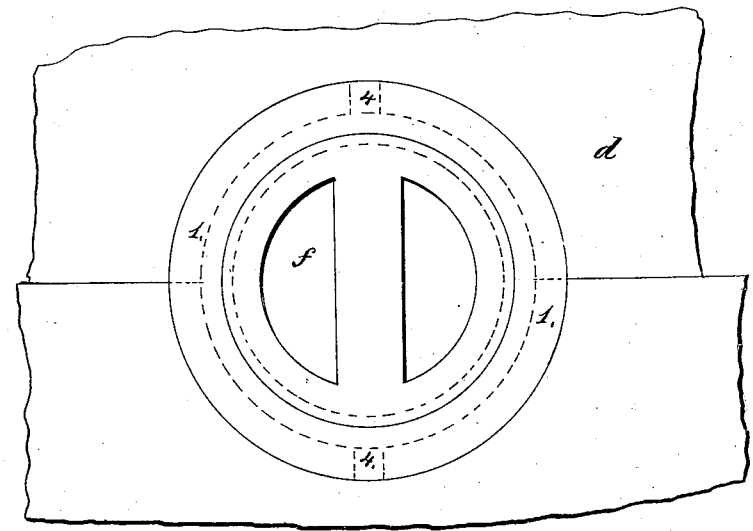

Figure 1 is a section of said bung, and Fig. 2 is a plan of the same.

Metallic vessels have heretofore been made for containing various substances, and in some instances they have been protected by a covering of wood. Screw-bungs have also been proposed and employed for vessels of this character.

The nature of our said invention consists in a combined bung and connecting-rings, whereby the metallic lining of a cask or barrel is connected firmly to the ring receiving said bung, and that in turn is secured in the wood of the cask or barrel and receives the screw-bung, so that the most rigid, firm, and durable connection is effected, that is perfectly tight and not liable to become leaky from the concussion to which it may be subjected in use.

In the drawings, $a$ is a ring formed with flanges 1 and 2, that are to be inlet into the staves $d$ at the point where two staves come together; and to secure this ring from turning lugs 4 4 are provided, as shown by dotted lines, between the flanges 1 and 2, which lugs enter notches provided for them in the respective staves.

$c$ is the metallic lining of the barrel or cask, and $b$ is a screw-thimble with a flange, 3, that, being screwed into the ring $a$, confines the lining $c$ firmly between the flanges 2 and 3, and renders the joint between these respective surfaces perfectly tight, if the respective faces of the flanges are turned off true; or, if preferred, the metallic casing and the said thimble $b$ may be soldered together, or a washer or gasket of soft material introduced between them.

$f$ is the screw-bung, fitted to screw into the ring $a$, and provided with a cross-bar, as shown, or other suitable device whereby it may be turned. A washer may be introduced, as at $e$, to effectually prevent leakage. It will thus be seen that by the employment of the three pieces the lining is tightly held to the ring, and the ring, securely retained by the staves, receives the removable bung.

What we claim, and desire to secure by Letters Patent, is—

The ring $a$, retained in the staves, substantially as specified, in combination with the screw-thimble $b$ and bung $f$, for the purposes and as set forth.

In witness whereof we have hereunto set our signatures this 14th day of January, 1863.

JOHN S. LOOMIS.
A. THOMPSON.

Witnesses:
THOS. GEO. HAROLD,
CHAS. H. SMITH.